(12) United States Patent
Lee et al.

(10) Patent No.: US 10,466,535 B2
(45) Date of Patent: Nov. 5, 2019

(54) BACKLIGHT UNIT, DISPLAY DEVICE INCLUDING THE BACKLIGHT UNIT, AND METHOD OF MANUFACTURING THE DISPLAY DEVICE

(71) Applicant: Samsung Display Co., Ltd., Yongin-si (KR)

(72) Inventors: Cheol Se Lee, Suwon-si (KR); Kyu Tae Park, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/847,841

(22) Filed: Dec. 19, 2017

(65) Prior Publication Data

US 2019/0033662 A1 Jan. 31, 2019

(30) Foreign Application Priority Data

Jul. 28, 2017 (KR) .......................... 10-2017-0096159

(51) Int. Cl.
*G09F 13/04* (2006.01)
*G02F 1/1335* (2006.01)

(52) U.S. Cl.
CPC .. *G02F 1/133608* (2013.01); *G02F 1/133605* (2013.01); *G02F 1/133603* (2013.01)

(58) Field of Classification Search
CPC ......... G02F 1/133604; G02F 1/133608; G02F 1/133605
USPC ........................................................ 362/97.2
See application file for complete search history.

(56) References Cited

U.S. PATENT DOCUMENTS

| 7,407,305 | B2 | 8/2008 | Chen et al. | |
|---|---|---|---|---|
| 2007/0103908 | A1* | 5/2007 | Tabito | G02F 1/133608 362/294 |
| 2007/0183136 | A1* | 8/2007 | Park | G02F 1/133603 362/97.4 |
| 2007/0297163 | A1* | 12/2007 | Kim | G02F 1/133603 362/23.11 |
| 2015/0362653 | A1* | 12/2015 | Chang | G02B 6/0021 362/606 |
| 2018/0107067 | A1* | 4/2018 | Yamano | G02F 1/133611 362/609 |

* cited by examiner

*Primary Examiner* — Ahshik Kim
(74) *Attorney, Agent, or Firm* — H.C. Park & Associates, PLC

(57) ABSTRACT

A backlight unit, a display device including the backlight unit, and a method of manufacturing the display device. The backlight unit includes: a bottom chassis having one or more through holes; and a reflective sheet disposed on the bottom chassis and including a flat portion having a flat surface and an inclined portion connected to the flat portion to form an inclined surface. The inclined portion of the reflective sheet is at least partially inserted into each of the through holes of the bottom chassis.

18 Claims, 11 Drawing Sheets

BACKLIGHT UNIT, DISPLAY DEVICE INCLUDING THE BACKLIGHT UNIT, AND METHOD OF MANUFACTURING THE DISPLAY DEVICE

CROSS-REFERENCE TO RELATED APPLICATION

This application claims priority from and the benefit of Korean Patent Application No. 10-2017-0096159, filed on Jul. 28, 2017, which is hereby incorporated by reference for all purposes as if fully set forth herein.

BACKGROUND

Field

Exemplary embodiments relate to a backlight unit, a display device including the backlight unit, and a method of manufacturing the display device.

Discussion of the Background

With the development of multimedia, display devices are becoming increasingly important. Accordingly, various display devices, such as liquid crystal displays (LCDs) and organic light-emitting diode displays (OLEDs), are being developed.

Of these display devices, an LCD includes a display panel which includes a pair of substrates having field generating electrodes, such as pixel electrodes and a common electrode, and a liquid crystal layer interposed between the two substrates and a backlight unit which provides light to the display panel. The LCD rearranges the orientations of the liquid crystals by applying voltages to the field generating electrodes, thereby controlling the amount of light that passes through the liquid crystal layer in each pixel. Accordingly, an image is displayed on the LCD.

However, if a sheet-like member, such as a reflective sheet, is placed directly on a bottom portion of a bottom chassis of the backlight unit, the reflective sheet can be damaged by a seating jig, which degrades display quality. In addition, if an embossed pattern is formed in the vicinity of a through hole in the bottom chassis, into which the seating jig is inserted to partially separate the bottom chassis and the reflective sheet, the dimensional tolerance of the backlight unit is increased. The increased dimensional tolerance causes misalignment of parts, resulting in a reduction in product yield.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a method of manufacturing a display device by fixing a backlight unit on a seating jig and then coupling a display panel to the backlight unit.

Exemplary embodiments also provide a backlight unit having excellent outgoing light efficiency and a display device having improved display quality by preventing a reflective sheet from being damaged during a process of manufacturing a display device.

Exemplary embodiments also provide a method of manufacturing a display device, in which the method is capable of improving process efficiency using a seating jig while improving a yield by maintaining a low dimensional tolerance of a backlight unit.

Additional aspects will be set forth in the detailed description which follows, and, in part, will be apparent from the disclosure, or may be learned by practice of the inventive concept.

An exemplary embodiment discloses a backlight unit including: a bottom chassis having one or more through holes; and a reflective sheet disposed on the bottom chassis and including a flat portion having a flat surface and an inclined portion connected to the flat portion to form an inclined surface. The inclined portion of the reflective sheet is at least partially inserted into each of the through holes of the bottom chassis.

The reflective sheet may have a cutout portion in plan view, wherein the cutout portion may comprise a cutout hole and a plurality of cutout slits extending from the cutout hole, and a portion of the reflective sheet around the cutout portion may form the inclined surface and is thus inserted into each of the through holes of the bottom chassis.

The backlight unit may further include a light source which is disposed on the bottom chassis and emits light, wherein the reflective sheet may further include a light source insertion hole, and the light source is inserted into the light source insertion hole of the reflective sheet.

The bottom chassis has a first surface facing the reflective sheet and a second surface located opposite the first surface, wherein the second surface of the bottom chassis may have an embossed pattern, and each of the through holes of the bottom chassis into which the inclined portion of the reflective sheet is inserted may not overlap the embossed pattern.

The backlight unit may further include a middle mold disposed on the reflective sheet and an optical sheet which is disposed on the middle mold, wherein the middle mold may include sidewalls, a fixing portion which is connected to the sidewalls of the middle mold and protrudes inward from the sidewalls of the middle mold, and a support portion which is connected to the sidewalls of the middle mold and has a predetermined top surface area. The reflective sheet may be disposed between the fixing portion of the middle mold and the bottom chassis, the sidewalls of the middle mold may be housed in the bottom chassis, and an upper surface of the support portion of the middle mold may support the optical sheet.

Each of the through holes of the bottom chassis may be aligned with the cutout hole of the reflective sheet, the cutout hole of the reflective sheet may overlap the optical sheet, and the reflective sheet may have two cutout holes.

In a cross section cut across each of the through holes of the bottom chassis, the inclined portion of the reflective sheet may include a first inclined portion which is inserted into the through hole and a second inclined portion which is inserted into the through hole and has a different slope from the first inclined portion, and is spaced apart from the first inclined portion.

The first inclined portion and the second inclined portion may be simultaneously inserted into one through hole of the bottom chassis, and an end of the first inclined portion and an end of the second inclined portion may be located between facing inner walls of the through hole of the bottom chassis.

The bottom chassis may have a substantially rectangular planar shape having two long sides and two short sides, the number of the through holes of the bottom chassis, into each of which the inclined portion of the reflective sheet is inserted, may be two, and the two through holes may be located on either side of a reference line passing through a center of the bottom chassis.

Another exemplary embodiment discloses a display device including: a bottom chassis having one or more through holes; a reflective sheet disposed on the bottom chassis and including a flat portion having a flat surface and an inclined portion connected to the flat portion to form an inclined surface; and a display panel disposed on the reflective sheet. The inclined portion of the reflective sheet is at least partially inserted into each of the through holes of the bottom chassis.

An exemplary embodiment also discloses a method of manufacturing a display device. The method includes: preparing a backlight unit which includes a bottom chassis having a bottom portion and sidewalls and a reflective sheet housed in the bottom chassis. The bottom portion of the bottom chassis has one or more through holes, the reflective sheet has one or more cutout portions, and each of the cutout portions includes a cutout hole and a plurality of cutout slits extending from the cutout hole. The method also includes supporting the backlight unit by inserting a seating jig into each of the through holes of the bottom portion of the bottom chassis; placing a display panel on the supported backlight unit and coupling the backlight unit and the display panel to each other; and removing the seating jig from each of the through holes of the bottom portion of the bottom chassis of the backlight unit coupled to the display panel.

The preparing of the backlight unit may include: preparing the bottom chassis having the bottom portion and the sidewalls; placing a light source on the bottom portion of the bottom chassis; and placing the reflective sheet on the bottom portion of the bottom chassis. The reflective sheet may further include a light source insertion hole and, in the placing of the reflective sheet, the reflective sheet may be placed such that each of the through holes of the bottom chassis is aligned with the cutout hole of the reflective sheet and that the light source is inserted into the light source insertion hole of the bottom chassis.

The preparing of the bottom chassis may include: preparing a frame for manufacturing a bottom chassis, the frame having the two through holes; fixing the position of the frame by inserting a fixing pin into each of the two through holes of the frame; and forming the bottom chassis by processing the frame through a press process or a bending process in a state where the position of the frame is fixed.

In the placing of the reflective sheet on the bottom portion of the bottom chassis, the reflective sheet may be substantially flat, and a planar size of the through holes of the bottom chassis may be greater than that of the cutout hole of the reflective sheet.

The cutout hole of the reflective sheet may have substantially a circular planar shape, and the cutout hole may have a diameter less than or equal to 10 millimeters, and the cutout slits may have a length less than or equal to five times the diameter of the cutout hole.

The seating jig may include: a body portion having a convex curved end; a step portion formed at sides of the body portion; and a groove portion located between the step portion and the end. The bottom portion of the bottom chassis of the backlight unit may be supported by the step portion of the seating jig in the supporting of the backlight unit by inserting the seating jig.

In the supporting of the backlight unit by inserting the seating jig, a portion of the reflective sheet around each of the cutout portions may be partially curved by upward pressure of the end of the seating jig.

In the removing of the seating jig, the portion of the reflective sheet around each of the cutout portions may be partially curved by downward pressure of the groove portion of the seating jig to form an inclined surface and thus, may be inserted into one of the through holes of the bottom chassis.

The preparing of the backlight unit may further include placing an optical sheet on the reflective sheet such that the optical sheet is spaced apart from the reflective sheet, wherein the cutout hole of the reflective sheet may overlap the optical sheet.

In an exemplary embodiment, the coupling of the backlight unit and the display panel to each other may include placing the display panel on the optical sheet, wherein the cutout hole of the reflective sheet may overlap the display panel.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concepts.

DETAILED DESCRIPTION OF THE ILLUSTRATED EMBODIMENTS

Figure 1:
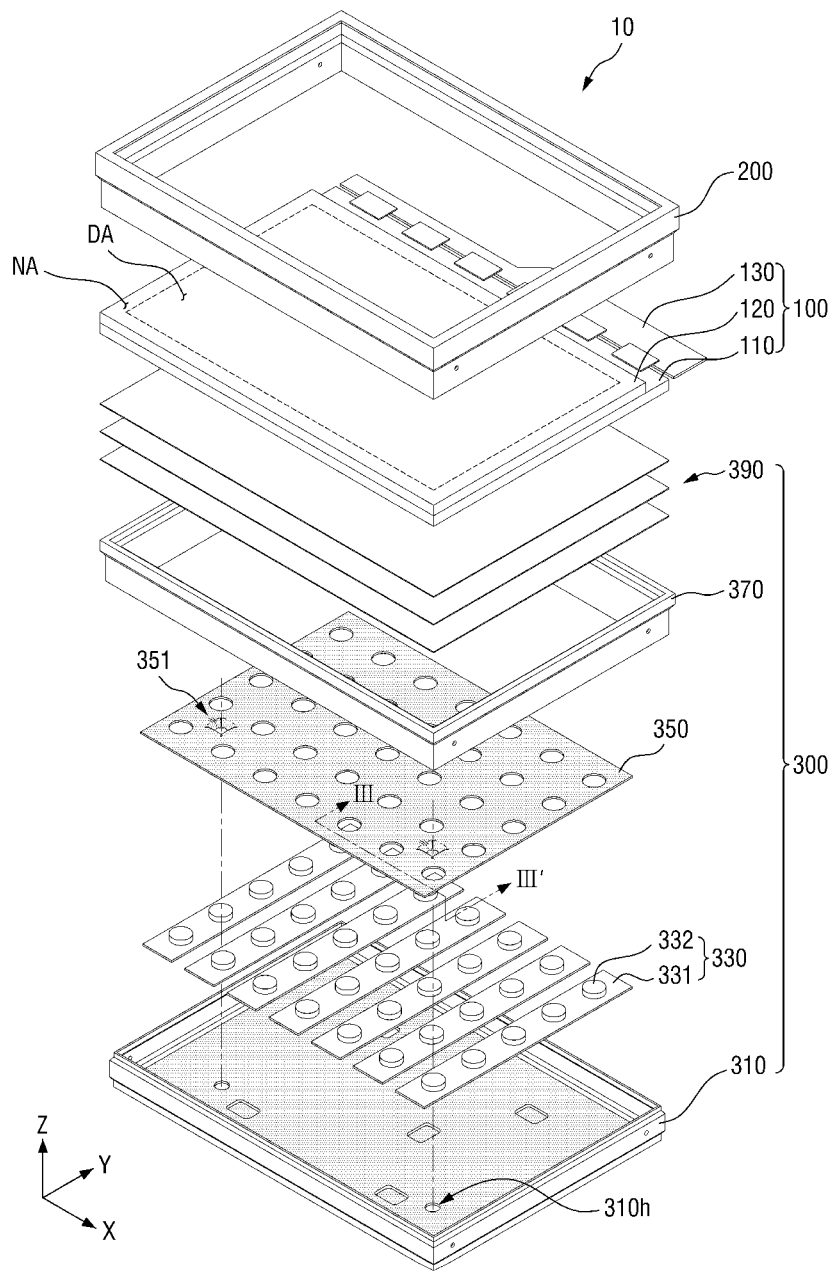
FIG. 1 is an exploded perspective view of a display device according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments of the inventive concepts will be described with reference to the accompanying drawings.

Figure 2:
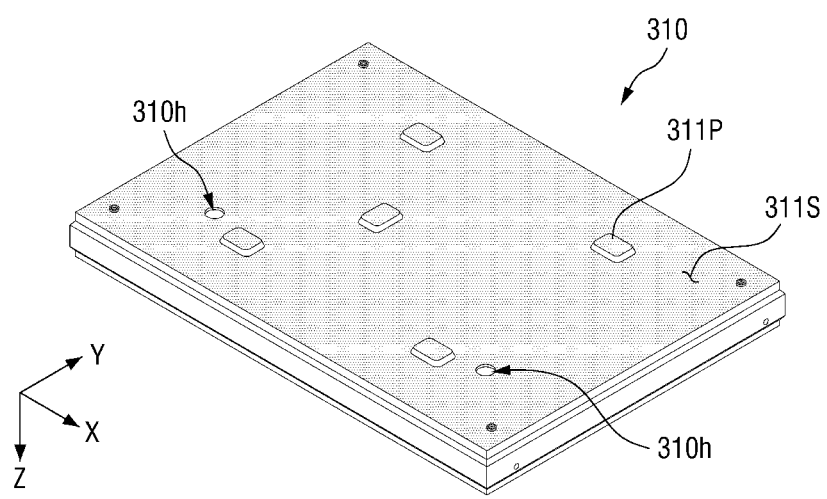
FIG. 2 is a bottom perspective view of a bottom chassis of FIG. 1.
Figure 3:
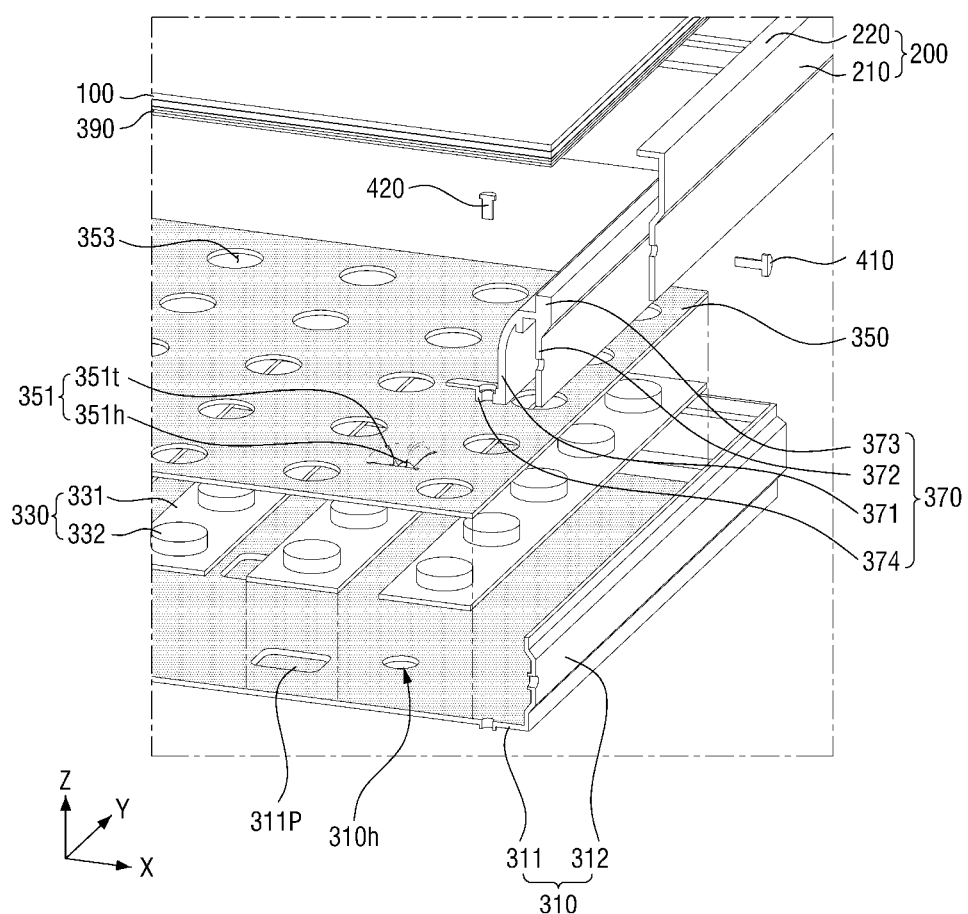
FIG. 3 is a cross-sectional perspective view taken along the line of FIG. 1.
Figure 4:
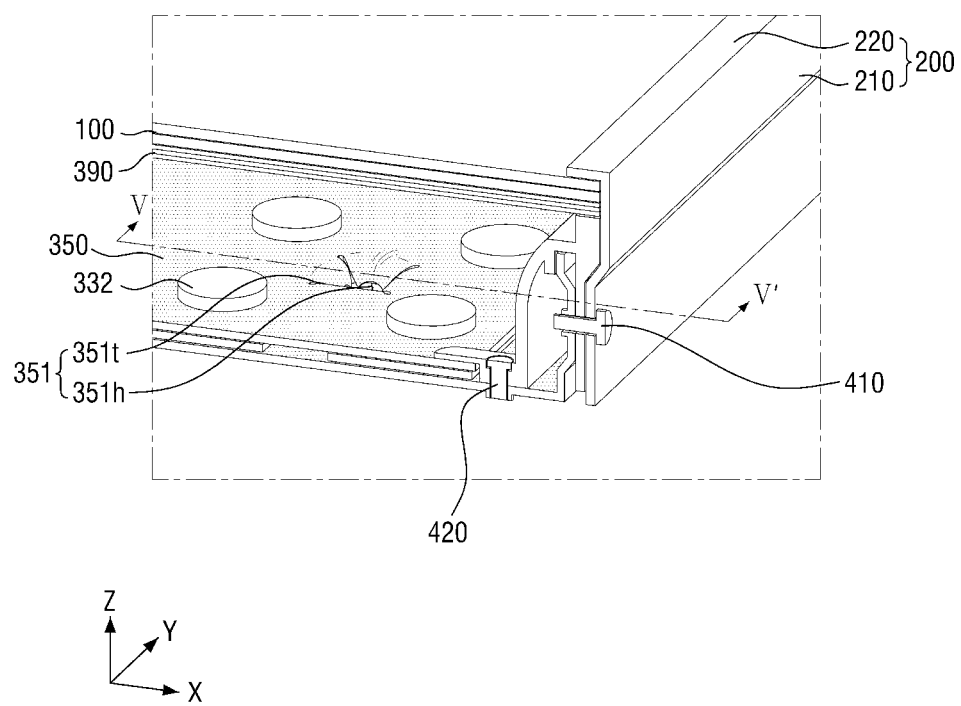
FIG. 4 is a cross-sectional perspective view of the display device of FIG. 3 which has been assembled.

FIG. 1 is an exploded perspective view of a display device 10 according to an exemplary embodiment. FIG. 2 is a bottom perspective view of a bottom chassis 310 of FIG. 1. FIG. 3 is a cross-sectional perspective view taken along the line of FIG. 1, specifically, a cross-sectional perspective view taken along the first direction X to show an area around a through hole 310$h$ of the bottom chassis 310. FIG. 4 is a cross-sectional perspective view of the display device 10 of FIG. 3 which has been assembled.

Referring to FIGS. 1 through 4, the display device 10 according to an exemplary embodiment may include a backlight unit 300, a display panel 100, and a top chassis 200.

The display panel 100 may be a panel member including elements necessary for the display device 10 to display an image. In an exemplary embodiment, the display panel 100 may be a liquid crystal display panel including a lower substrate 110, an upper substrate 120, and a liquid crystal layer (not illustrated) interposed between the lower substrate 110 and the upper substrate 120. However, other display panels that require the backlight unit 300 to display an image can also be applied as the display panel 100. The lower substrate 110 and the upper substrate 120 may be bonded together by a sealing member (not illustrated), such as a sealant.

In plan view, a display area DA and a non-display area NA may be defined in the display panel 100. The display area DA is an area substantially contributing to image display by including a plurality of pixels, each expressing a different image. As used herein, 'pixels' refer to single regions into which the display area DA is divided for color display in plan view, and one pixel is a minimum unit that can express a color independently of other pixels. That is, each of the pixels may uniquely display one of primary colors in order to implement color display. Examples of the primary colors include red, green, and blue.

In plan view, the display area DA may be surrounded by the non-display area NA. A pad unit (not illustrated) connected to a driving circuit (not illustrated) and/or a driving element 130 may be located in the non-display area NA and receive a driving signal.

The top chassis 200 may be a housing member of the display device 10 including the display panel 100. In an exemplary embodiment, the top chassis 200 may include sidewalls 210 and a protrusion 220 protruding inwardly of the display device 10 from the top of the sidewalls 210. The sidewalls 210 of the top chassis 200 may surround the display panel 100 and the backlight unit 300, and the protrusion 220 of the top chassis 200 may form a bezel region by partially covering the non-display area NA of the display panel 100. The top chassis 200 may be shaped like a substantially quadrilateral band in plan view by including a pair of long sides and a pair of short sides.

The two long sides and the two short sides of the top chassis 200 may be formed integrally with each other without a physical boundary, or the two long sides and the two short sides may be separately manufactured and assembled together. For example, a long side and a short side may be fitted together, screwed together, or joined using a connecting member.

The sidewalls 210 of the top chassis 200 may be coupled to the backlight unit 300 by first screws 410, and the protrusion 220 of the top chassis 200 may fix the display panel 100 in the third direction Z. For example, the sidewalls 210 of the top chassis 200 may be coupled to a middle mold 370 and the bottom chassis 310 by the first screws 410. In addition, the protrusion 220 of the top chassis 200 may fix the display panel 100 together with the middle mold 370. In an exemplary embodiment, the top chassis 200 may be omitted. The coupling relationship between the display panel 100 and the backlight unit 300 and the shape of the housing can be variously modified. For example, the display panel 100 and the backlight unit 300 may be directly coupled to each other using a bonding member such as a double-sided tape.

The backlight unit 300 may provide light having a specific wavelength to the display panel 100. The backlight unit 300 may overlap the display panel 100 in the third direction Z and may be located under the display panel 100.

In an exemplary embodiment, the backlight unit 300 may include the bottom chassis 310, a light source unit 330 housed in the bottom chassis 310, a reflective sheet 350, the middle mold 370, and an optical sheet 390.

The bottom chassis 310 may be a housing member of the backlight unit 300 including the light source unit 330. The bottom chassis 310 may provide a space in which the light source unit 330 can be housed. For example, the bottom chassis 310 may be substantially shaped like a box by including a bottom portion 311 and a plurality of sidewalls 312 protruding upward from edges of the bottom portion 311. The bottom chassis 310 may generally have a substantially rectangular planar shape by including a pair of short sides and a pair of short sides.

The bottom portion 311 and the sidewalls 312 of the bottom chassis 310 may be integrally formed with each other without a physical boundary, or the bottom portion 311 and the sidewalls 312 may be separately manufactured and assembled together. For example, the bottom portion 311 and the sidewalls 312 of the bottom chassis 310 may be integrally formed without a physical boundary. Here, the sidewalls 312 connected to the bottom portion 311 may be formed in a bent shape by a bending process.

The bottom chassis 310 may include a material having certain rigidity and excellent thermal conductivity. For example, the bottom chassis 310 may include a metal material such as iron, copper, or aluminum, or an alloy of these metal materials. In some exemplary embodiments, the bottom chassis 310 may have its surface plated or coated with zinc or the like.

The bottom portion 311 of the bottom chassis 310 may have one or more through holes 310h. Each of the through holes 310h may have a substantially circular planar shape. As a non-limiting example, the number of the through holes 310h of the bottom chassis 310 may be two. One or more inclined portions 363 of the reflective sheet 350 which will be described later may be inserted into the through holes 310h. The through holes 310h will be described in detail later with reference to FIG. 5, etc.

In an exemplary embodiment, the bottom portion 311 of the bottom chassis 310 may further include one or more embossed patterns 311P. For example, an outer surface (a lower surface) of the bottom portion 311 of the bottom chassis 310 may have a base surface 311S and the embossed patterns 311P protruding from the base surface 311S. The base surface 311S may occupy most of the planar area of the bottom portion 311 of the bottom chassis 310 and may be a substantially flat surface. For example, the planar area of the base surface 311S may be at least about 50%, at least about 60%, at least about 70%, at least about 80%, or at least about 90% of the planar area of the bottom portion 311. The embossed patterns 311P protrude from the base surface 311S to form grooves on the outer surface of the bottom chassis 310. The embossed patterns 311P and the grooves formed by the embossed patterns 311P may be used for coupling the backlight unit 300 to other components, for mounting parts, for securing space, or for other purposes.

The bottom chassis 310 may have a substantially uniform thickness. The thickness of the bottom chassis 310 at the base surface 311S of the bottom chassis 310, that is, at a portion where the embossed patterns 311P are not formed may be substantially equal to the thickness of the bottom chassis 310 at the embossed patterns 311P of the bottom chassis 310. For example, the embossed patterns 311P of the bottom chassis 310 may be formed by a press process, and the thickness of the bottom chassis 310 at the embossed patterns 311P may be substantially equal to the thickness of the bottom chassis 310 at the portion where the embossed patterns 311P are not formed. The thickness of the bottom chassis 310 may be, but is not limited to, about 0.5 millimeters (mm) to 1.2 mm.

In some exemplary embodiments, the through holes 310h and the embossed patterns 311P of the bottom chassis 310 may be formed at positions that do not overlap each other. That is, in plan view, the through holes 310h into which the inclined portions 363 of the reflective sheet 350 are inserted may not overlap the embossed patterns 311P. As will be described later in a method of manufacturing a display device, the bottom chassis 310 may be manufactured through a press process or a bending process in a state where a frame for manufacturing the bottom chassis 310 is fixed in position by inserting fixing pins into the through holes 310h. The fixing pins may be used to fix the position of the frame for manufacturing the bottom chassis 310 in a horizontal direction (i.e., the first direction X and the second direction Y) during the process of manufacturing the bottom chassis 310 and, at the same time, manage the dimensions of the backlight unit 300 using the distance between the through holes 310h. If the through holes 310h into which the fixing pins are inserted overlap the embossed patterns 311P, the distance (between the through holes 310h and the bottom portion 311 of the bottom chassis 310) in a height direction (i.e., the third direction Z) increases. In this case, the dimensions should be managed by considering not only the distance between the two through holes 310h in the first direction X but also the distance between the through holes 310h and the bottom portion 311 of the bottom chassis 310. This may make the dimensional management difficult and increase dimensional tolerance.

The light source unit 330 may be disposed on the bottom portion 311 of the bottom chassis 310. The light source unit 330 may include a light source circuit board 331 and a plurality of light sources 332 mounted on the light source circuit board 331.

The light source circuit board 331 may provide signals and power necessary for driving the light sources 332. In an exemplary embodiment, the light source circuit board 331 may extend in the second direction Y and may be provided in a plurality, wherein the light source circuit boards 331 may be spaced apart from each other in the first direction X.

The light sources 332 may be disposed on the light source circuit board 331. Each of the light sources 332 may be a component that directly emits light. In an exemplary embodiment, each of the light sources 332 may be a light emitting diode. Each of the light sources 332 may emit white light, blue light, or light in an ultraviolet wavelength band. The light sources 332 disposed on the light source circuit board 331 may be spaced apart from each other in the second direction Y. In FIG. 1, five light sources 332 are arranged on one light source circuit board 331. However, the inventive concepts are not limited to this case.

In plan view, the light sources 332 may overlap the display area DA of the display panel 100 in the third direction Z and provide light directly toward the display panel 100. That is, the backlight unit 300 according to the current exemplary embodiment may be a direct-type backlight unit. The light sources 332 may be arranged in the first direction X and the second direction Y to form substantially a matrix. In an exemplary embodiment, the backlight unit 300 may be an edge-type backlight unit that further includes a light guide plate and has a light source disposed on a side of the light guide plate.

The reflective sheet 350 may be disposed on the bottom portion 311 of the bottom chassis 310. For example, the reflective sheet 350 may be disposed on the light source unit 330. The reflective sheet 350 may reflect incident light toward the display panel 100. For example, when the optical sheet 390 includes a reflective polarizer, a polarization component reflected by the reflective polarizer may be reflected again by the reflective sheet 350 to proceed upward. In addition, of light emitted from the light sources 332, light leaking in a direction other than the direction toward the display panel 100 may also be reflected by the reflective sheet 350 to proceed upward. Accordingly, this can increase the utilization efficiency of light provided from the light source unit 330 and improve the luminance and display quality of the display device 10.

The reflective sheet 350 can be made of any material having high light reflectance. For example, the reflective sheet 350 may be made of a plastic material, such as polyethylene terephthalate. In addition, the reflective sheet 350 may have flexibility. In some exemplary embodiments, the reflective sheet 350 may have its surface coated with a metal such as titanium (Ti) or silver (Ag), or with a metal oxide such as titanium oxide.

In an exemplary embodiment, the reflective sheet 350 may have one or more cutout portions 351. Each of the cutout portions 351 of the reflective sheet 350 may include a substantially circular cutout hole 351$h$ and a plurality of cutout slits 351$t$ extending from the cutout hole 351$h$, as shown in detail in FIG. 3.

In plan view, the cutout hole 351$h$ of the reflective sheet 350 may be aligned with each of the through holes 310$h$ of the bottom chassis 310. In addition, the cutout hole 351$h$ of the reflective sheet 350 may overlap the optical sheet 390 and the display panel 100. For example, the cutout hole 351$h$ of the reflective sheet 350 may be located in the display area DA in plan view.

The cutout slits 351$t$ may extend substantially radially from the cutout hole 351$h$. In FIG. 3, etc., one cutout portion 351 includes four cutout slits 351$t$. However, the number of the cutout slits 351$t$ can be three or five or more. A portion of the reflective sheet 350 around each of the cutout portions 351 may form an inclined surface and thus, may be inserted into a corresponding one of the through holes 310$h$ of the bottom chassis 310. For example, a portion of the reflective sheet 350 between two adjacent cutout slits 351$t$ may form an inclined surface and thus may be inserted into one of the through holes 310$h$. When there are three or more cutout slits 351$t$, the inclined portions 363 of the reflective sheet 350 can be easily formed, and the reflective sheet 350 can be prevented from being lifted from the bottom portion 311 of the bottom chassis 310 even though portions of the reflective sheet 350 form inclined surfaces.

As a non-limiting example, the reflective sheet 350 may have two cutout portions 351. That is, the number of the through holes 310$h$ of the bottom chassis 310 into which the reflective sheet 350 is partially inserted and the number of the cutout portions 351 of the reflective sheet 350 may each be two. As will be described later in the method of manufacturing a display device, a seating jig may be inserted into each of the through holes 310$h$ of the bottom chassis 310 and each of the cutout holes 351$h$ of the cutout portions 351 of the reflective sheet 350. The seating jig can stably support the backlight unit 300 while fixing the position of the backlight unit 300 in the horizontal direction (i.e., the first direction X and the second direction Y).

When there is only one point where the seating jig is inserted or coupled, the position of the backlight unit 300 in the horizontal direction cannot be fixed because the backlight unit 300 is rotatable in a plane. In addition, when there are three or more points where the seating jig is inserted or coupled, the distance between every two of the insertion points should be adjusted. This makes the dimensional management difficult, leading to an increase in the dimensional tolerance.

On the other hand, when there are two points where the seating jig is inserted or coupled as in the current embodiment, the position of the backlight unit 300 in the horizontal direction can be fixed. In addition, since the dimensional management is possible only by controlling the distance between the two through holes 310$h$ in the first direction X, the dimensional tolerance can be minimized, and the display panel 100 can be coupled to a correct position. Therefore, the number of alignment defects can be minimized, and the yield can be improved.

In addition, the two through holes 310$h$ may be located on either side of a reference line passing through the center of the bottom portion 311 of the bottom chassis 310, and the two cutout portions 351 may be located on either side of the reference line passing through the center of the reflective sheet 350. For example, the two through holes 310$h$ may all be located adjacent to vertices of a long side of the bottom chassis 310, and the two cutout portions 351 may all be located adjacent to the vertices of the long side of the reflective sheet 350. Since the through holes 310$h$ and the cutout portions 351 into each of which the seating jig is inserted are formed adjacent to a long side of the backlight unit 300, the seating jig can stably support the backlight unit 300. In addition, since the two through holes 310$h$ and the two cutout portions 351 are formed on any one side of the reference line, the distance between the two through holes 310$h$ or between the two cutout portions 351 may be relatively small, which makes the dimensional management easier.

In some exemplary embodiments, the reflective sheet 350 may further include light source insertion holes 353, as shown in FIG. 3. The light source insertion holes 353 may be formed at positions corresponding to the light sources 332 in plan view. The light sources 332 of the light source unit 330 may be inserted into the light source insertion holes 353 of the reflective sheet 350 and may protrude above the reflective sheet 350. In an exemplary embodiment in which an edge-type backlight unit is applied as the backlight unit 300, the light source insertion holes 353 may be omitted.

The middle mold 370 may be disposed on the reflective sheet 350. The middle mold 370 may be coupled to the bottom chassis 310, thereby providing a space for stably supporting the optical sheet 390 and the display panel 100.

In an exemplary embodiment shown in FIG. 3, the middle mold 370 may include first sidewalls 371, second sidewalls 372 located outside the first sidewalls 371, a support portion 373 connecting the first sidewalls 371 and the second sidewalls 372 and supporting the optical sheet 390 with a predetermined top surface area, and a fixing portion 374 protruding inward from the first sidewalls 371. The middle mold 370 may be shaped like a substantially quadrilateral band in plan view by including a pair of long sides and a pair of short sides. The two long sides and the two short sides of the middle mold 370 may be formed integrally with each other without a physical boundary, or the two long sides and the two short sides may be separately manufactured and assembled together. For example, a long side and a short side may be fitted together, screwed together, or joined using a connecting member.

The support portion 373 of the middle mold 370 may be a portion that supports and/or fixes the optical sheet 390 and the display panel 100 with a predetermined top surface area. That is, the support portion 373 may at least partially overlap an edge portion of the optical sheet 390 and/or the display panel 100.

The first sidewalls 371 of the middle mold 370 may be housed in the bottom chassis 310. The first sidewalls 371 may connect the support portion 373 and the fixing portion 374 of the middle mold 370. The fixing portion 374 of the middle mold 370 may extend inward from the first sidewalls 371. The reflective sheet 350 may be interposed between the fixing portion 374 of the middle mold 370 and the bottom portion 311 of the bottom chassis 310 and fixed in the third direction Z. In addition, the middle mold 370 may be coupled to the bottom chassis 310 by second screws 420. For example, the fixing portion 374 of the middle mold 370 may be coupled to the bottom portion 311 of the bottom chassis 310 by the second screws 420.

The second sidewalls 372 of the middle mold 370 may be placed to surround the sidewalls 312 of the bottom chassis 310. The sidewalls 312 of the bottom chassis 310 may be inserted into a space between the first sidewalls 371 and the second sidewalls 372 of the middle mold 370. The middle mold 370 may be coupled to the top chassis 200 by the first screws 410. For example, the second sidewalls 372 of the middle mold 370 may be coupled to the sidewalls 312 of the bottom chassis 310 and the sidewalls 210 of the top chassis 200 by the first screws 410. However, the coupling relationship between the backlight unit 300 and the top chassis 200 and the shape and coupling relationship of the middle mold 370 can be variously modified.

The middle mold 370 may include a material having certain rigidity and excellent durability. For example, the middle mold 370 may include plastic such as polycarbonate, a non-metallic inorganic material, or a carbon fiber.

The optical sheet 390 may be disposed on the light sources 332 to be spaced apart from the light sources 332. The optical sheet 390 may overlap the display panel 100 in the third direction Z. For example, the edge portion of the optical sheet 390 may be stably supported by the support portion 373 of the middle mold 370.

The optical sheet 390 can improve the luminance, viewing angle characteristics, etc. of the display device 10 by modulating the path and/or polarization characteristic of light emitted from the light sources 332 and directed toward the display panel 100. In an exemplary embodiment, the optical sheet 390 may include at least one of a prism sheet, a light collecting sheet such as a lens sheet, a diffusion sheet, and a reflective polarizing sheet. In FIG. 1, etc., the optical sheet 390 includes three separate optical sheets. However, the optical sheet 390 may also be a single sheet, two sheets, or four or more sheets. Alternatively, a plurality of optical sheets 390 may be combined and integrated.

The reflective sheet 350 according to the current exemplary embodiment will now be described in more detail with reference to FIG. 5.

Figure 5:
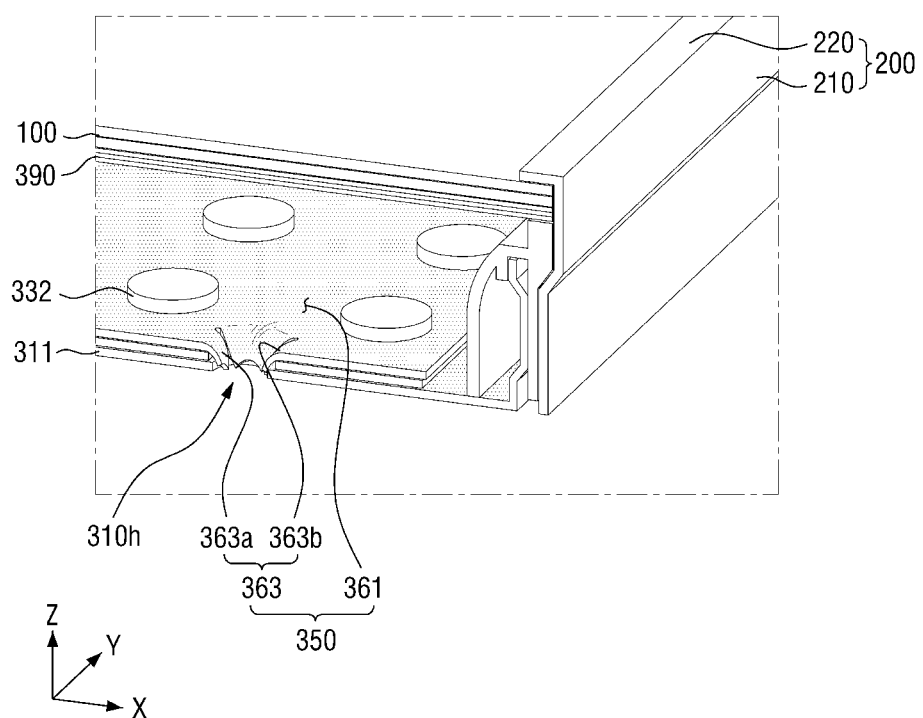
FIG. 5 is a cross-sectional perspective view taken along the line V-V' of FIG. 4.

FIG. 5 is a cross-sectional perspective view taken along the line V-V' of FIG. 4, specifically, a cross-sectional perspective view taken across a through hole 310h of the bottom chassis 310 along the first direction X.

Referring to FIGS. 1 through 5, the reflective sheet 350 of the display device 10 according to the current exemplary embodiment includes a flat portion 361 and one or more inclined portions 363. The inclined portions 363 may be at least partially inserted into the through holes 310h of the bottom chassis 310, respectively.

The flat portion 361 may form a flat surface substantially parallel to a surface (an upper surface in the drawings) of the bottom portion 311 of the bottom chassis 310. The flat portion 361 may occupy most of the planar area of the reflective sheet 350 and perform a substantially main reflecting function. For example, the flat portion 361 may occupy at least about 50%, at least about 60%, at least about 70%, at least about 80%, or at least about 90% of the planar area of the reflective sheet 350.

Each of the inclined portions 363 may be connected to the flat portion 361 to form an inclined surface. That is, each of the inclined portions 363 may form an inclined surface at a predetermined angle to the surface of the bottom portion 311 of the bottom chassis 310. Each of the inclined portions 363 may be formed integrally with the flat portion 361 without a physical boundary. For example, each of the inclined portions 363 may be a portion formed by partially bending the reflective sheet 350. The inclined portions 363 may be at least partially inserted into the through holes 310h formed in the bottom portion 311 of the bottom chassis 310. Specifically, a portion of the reflective sheet 350 between two adjacent cutout slits 351t of each of the cutout portions 351 of the reflective sheet 350 may form an inclined portion 363.

In a cross section cut across each of the through holes 310h of the bottom chassis 310, each of the inclined portions 363 may include a first inclined portion 363a and a second inclined portion 363b. The first inclined portion 363a and the second inclined portion 363b may have different slopes and may be spaced apart from each other. A space between the first inclined portion 363a and the second inclined portion 363b defines the cutout hole 351h to be described later.

Both the first inclined portion 363a and the second inclined portion 363b may be simultaneously inserted into any one of the through holes 310h of the bottom chassis 310. In this case, an end of the first inclined portion 363a and an end of the second inclined portion 363b may be positioned between facing inner walls of the through hole 310h. That is, the inclined portions 363 of the reflective sheet 350 may be at least partially inserted into the through holes 310h of the bottom chassis 310 but may not protrude downward from the bottom chassis 310 through the through holes 310h. Accordingly, an improvement in the durability of the backlight unit 300 and the display device 10 can be realized.

The reflective sheet 350 of the display device 10 according to the current embodiment may remain at least partially inserted into the through holes 310h of the bottom chassis 310. Therefore, the reflective sheet 350 can remain stably fixed in the horizontal direction (i.e., the first direction X and the second direction Y). In addition, the reflective sheet 350 can be prevented from being lifted from the bottom portion 311 of the bottom chassis 310 even though seating jigs are inserted into the through holes 310h of the bottom chassis 310 during the process of manufacturing the display device 10. This can minimize the visibility of the cutout portions 351 of the reflective sheet 350 from the outside through the display panel 100.

Hereinafter, a method of manufacturing the display device 10 according to the current exemplary embodiment will be described.

FIGS. 6 through 11 are views illustrating a method of manufacturing a display device according to an exemplary embodiment.

Figure 6:
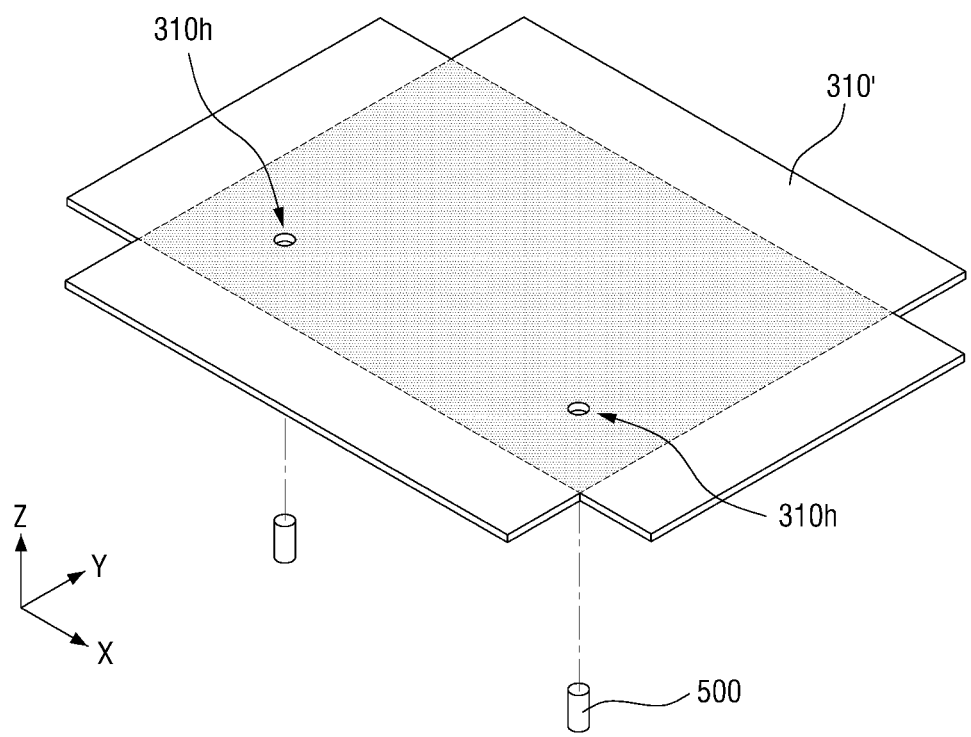
FIG. 6, FIG. 7, FIG. 8, FIG. 9, FIG. 10, and FIG. 11 are views illustrating a method of manufacturing a display device according to an exemplary embodiment.

Referring to FIG. 6, a frame 310' for manufacturing a bottom chassis is prepared and coupled to fixing pins 500.

The frame 310' for manufacturing a bottom chassis may be a member provided to manufacture a bottom chassis. For example, the frame 310' for manufacturing a bottom chassis may be a metal plate including a metal material such as iron, copper or aluminum, or an alloy of these metal materials. In some exemplary embodiments, the frame 310' for manufacturing a bottom chassis may have its surface plated with zinc or the like.

The frame 310' for manufacturing a bottom chassis may have one or more through holes 310h. The through holes 310h may be the same components as through holes 310h formed in a bottom portion 311 of a bottom chassis 310 which will be described later.

The fixing pins 500 may be inserted into the through holes 310h of the frame 310' for manufacturing a bottom chassis. The fixing pins 500 can fix the position of the frame 310' in the horizontal direction (i.e., the first direction X and the second direction Y) during the process of manufacturing the bottom chassis. In addition, the fixing pins 500 can be used for dimensional management of the bottom chassis and a backlight unit during the process of manufacturing the bottom chassis. That is, the dimensional management of the bottom chassis and the backlight unit can be performed using the distance between the two through holes 310h. For example, the size of the bottom portion of the bottom chassis, the length and height of sidewalls, and the position of embossed patterns which will be described later may be determined based on the through holes 310h.

As a non-limiting example, the frame 310' for manufacturing a bottom chassis may have two through holes 310h. As described above, the fixing pins 500 may be inserted into the through holes 310h. When there are two points at which the fixing pins 500 are inserted or coupled, it is possible to fix the position of the frame 310' in the horizontal direction while minimizing the dimensional tolerance.

In addition, as will be described later, after the fixing pins 500 are removed from the through holes 310h of the frame 310' for manufacturing a bottom chassis, seating jigs may be inserted into the through holes 310h of the frame 310'. The seating jigs can stably support the backlight unit while fixing the position of the backlight unit in the horizontal direction (i.e., the first direction X and the second direction Y). When there are two points at which the seating jigs are inserted or coupled, it is possible to fix the position of the backlight unit in the horizontal direction while minimizing the dimensional tolerance.

Furthermore, the two through holes 310h may be located on either side of a reference line passing through the center of the frame 310' for manufacturing a bottom chassis. For example, the two through holes 310h may all be located adjacent to vertices of any long side of the frame 310'.

Figure 7:
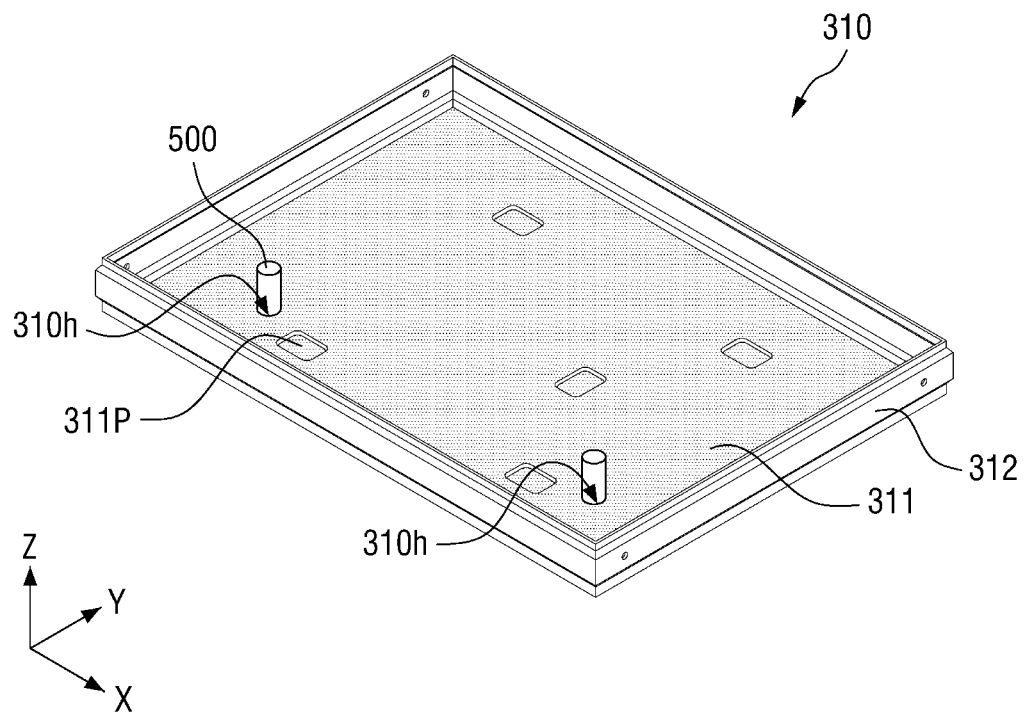

Referring to FIGS. 6 and 7, the bottom chassis 310 is manufactured in a state where the fixing pins 500 are inserted into the through holes 310h. In an embodiment, the manufacturing of the bottom chassis 310 may include processing the frame 310' for manufacturing a bottom chassis using a press process or a bending process. For example, the manufacturing of the bottom chassis 310 may include forming embossed patterns 311P on the surface of the frame 310' using a press process and forming sidewalls 312 of the bottom chassis 310 using a bending process.

The bottom chassis 310 may include the bottom portion 311 and the sidewalls 312. The bottom portion 311 of the bottom chassis 310 may have one or more through holes 310h and one or more embossed patterns 311P. The through holes 310h of the bottom chassis 310 may be the same components as the through holes 310h formed in the frame 310' for manufacturing a bottom chassis. In an exemplary embodiment, the embossed patterns 311P of the bottom chassis 310 may be formed at positions not overlapping the through holes 310h. Since the through holes 310h used to fix and manage the dimensions of the bottom chassis 310 are located in a base surface 311S, no gap may be formed between the through holes 310h and the bottom portion 311 of the bottom chassis 310 in the third direction Z, and a low dimensional tolerance can be maintained. Since the bottom chassis 310 has been described above with reference to FIGS. 1 through 5, a detailed description thereof will be omitted.

Figure 8:
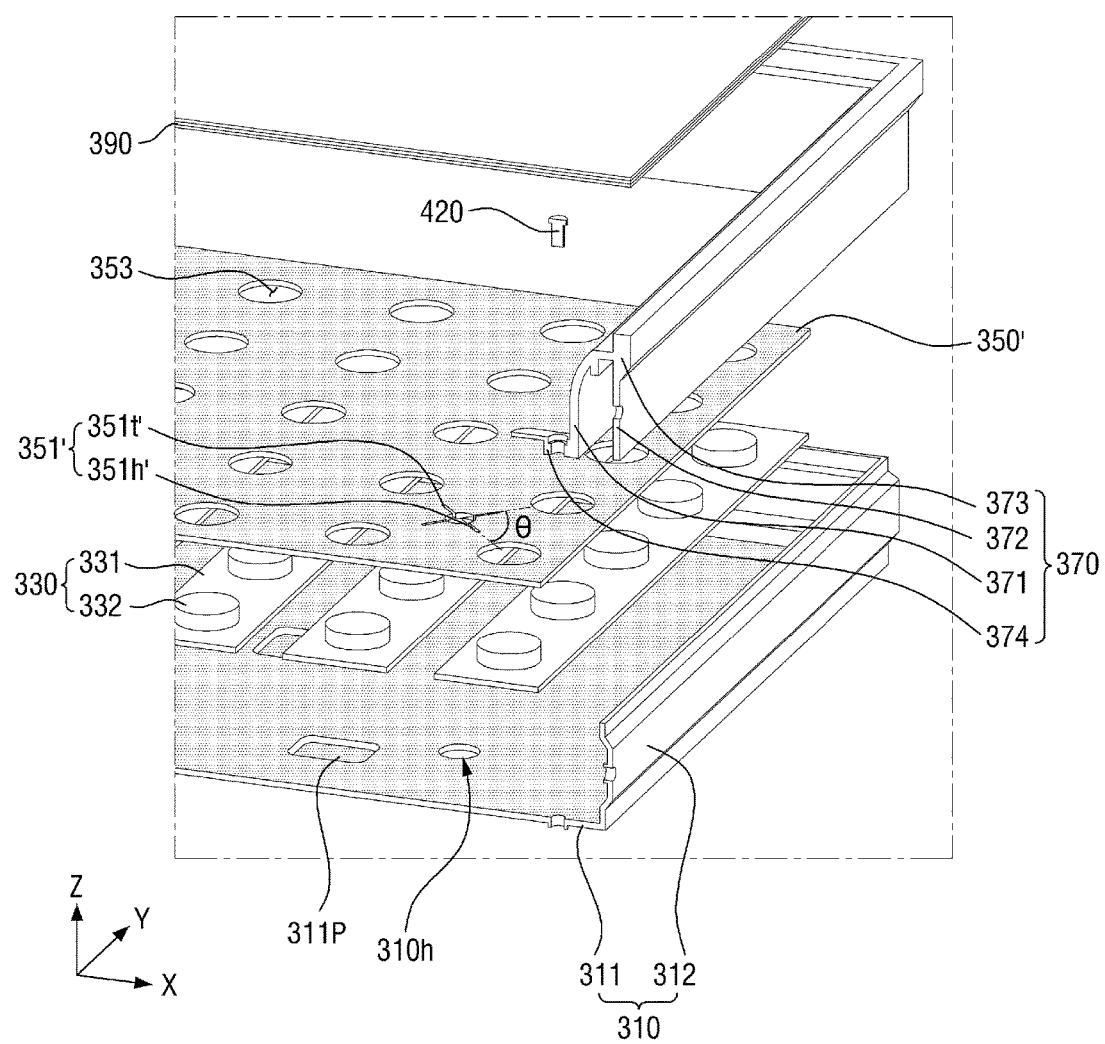

Referring to FIG. 8, a light source unit 330, a reflective sheet 350', a middle mold 370, and an optical sheet 390 are placed in the bottom chassis 310 and coupled together to manufacture a backlight unit 300.

In an exemplary embodiment, the manufacturing of the backlight unit 300 includes preparing the bottom chassis 310 having one or more through holes 310h, placing the light source unit 330, which includes one or more light source circuit boards 331 and light sources 332, on the bottom portion 311 of the bottom chassis 310, placing the reflective sheet 350' on the bottom portion 311 of the bottom chassis 310, placing the middle mold 370 on the bottom chassis 310 and coupling the bottom chassis 310 and the middle mold 370 to each other, and placing the optical sheet 390 on the middle mold 370.

As described above, the bottom chassis 310 may include the bottom portion 311 and the sidewalls 312, and the bottom portion 311 of the bottom chassis 310 may have one or more through holes 310h. The bottom chassis 310 may be the bottom chassis 310 manufactured according to FIGS. 6 and 7. The light source unit 330 may include the light source circuit boards 331 and the light sources 332 mounted on each of the light source circuit boards 331. Since the bottom chassis 310 and the light source unit 330 have been described above with reference to FIGS. 1 through 5, a redundant description thereof will be omitted.

The reflective sheet 350' may have one or more cutout portions 351' in plan view. Each of the cutout portions 351' of the reflective sheet 350' may include a substantially circular cutout hole 351h' and a plurality of cutout slits 351f extending from the cutout hole 351h'. The cutout slits 351f may extend substantially radially from the cutting hole 351h'. While one cutout portion 351' includes four cutout slits 351f in FIG. 8, the inventive concept is not limited to this case. For example, an included angle θ between two adjacent cutout slits 351f may be about 120 degrees or less, about 90 degrees or less, about 72 degrees or less, or about 60 degrees or less. When the included angle θ between the two cutout slits 351f is 120 degrees or less, 90 degrees or less, or an acute angle, an inclined portion 363 to be described later can be easily formed. In addition, the reflective sheet 350' can be prevented from being lifted from the bottom portion 311 of the bottom chassis 310 even though a portion of the reflective sheet 350' forms an inclined surface and thus is inserted into each of the through holes 310$h$ of the bottom chassis 310, as will be described later with reference to FIG. 11.

In an exemplary embodiment, the reflective sheet 350' may be substantially flat during the manufacturing of the backlight unit 300. That is, in the placing of the reflective sheet 350' on the bottom chassis 310, a portion of the reflective sheet 350' around each of the cutout portions 351' may be flat without forming an inclined surface.

The reflective sheet 350' may further include a plurality of light source insertion holes 353. The light source insertion holes 353 may be spaced apart in the first direction X and the second direction Y to form a substantially matrix shape.

In addition, in the placing of the reflective sheet 350', the reflective sheet 350' may be placed such that the through holes 310$h$ of the bottom chassis 310 are aligned with the cutout holes 351$h$' of the reflective sheet 350' and that the light sources 332 are inserted into the light source insertion holes 353. That is, the cutout holes 351$h$' and the light source insertion holes 353 of the reflective sheet 350' may be placed to overlap the through holes 310$h$ of the bottom chassis 310 and the light sources 332, respectively.

In this case, the planar size of the through holes 310$h$ of the bottom chassis 310 may be greater than the planar size of the cutout holes 351$h$' of the reflective sheet 350'. This allows the reflective sheet 350' to completely cover a surface (an upper surface in the drawings) of the bottom portion 311 of the bottom chassis 310. Since the surface of the bottom portion 311 of the bottom chassis 310 is not exposed, the bottom chassis 310 made of a metal material may not be visible from the outside through the display panel 100. In an exemplary embodiment, each of the cutout holes 351$h$' of the reflective sheet 350' may have a diameter of about 5 to 10 mm. When each of the cutout holes 351$h$' has a diameter of 5 mm or more, it may be sufficient to form an opening into which a seating jig to be described later can be inserted. When each of the cutout holes 351$h$' has a diameter of 10 mm or less, it may not be visible from the outside through the display panel 100. In addition, the length of the cutout slits 351$f$ may be about five times or less, about four times or less, or about three times or less than the diameter of the cutout hole 351$h$'. When the length of the cutout slits 351$f$ is five times or less than the diameter of the cutout hole 351$h$', the cutout slits 351$f$ may not be visible from the outside through the display panel 100. In addition, an inclined portion formed by a portion of the reflective sheet 350' around each of the cutout portions 351' may not protrude downward from the bottom chassis 310.

After the placing of the reflective sheet 350', the reflective sheet 350' is fixed using the middle mold 370, and a fixing portion 374 of the middle mold 370 is coupled to the bottom portion 311 of the bottom chassis 310 using second screws 420. Then, the optical sheet 390 is placed and fixed on a support portion 373 of the middle mold 370.

The optical sheet 390 may be spaced apart from the light sources 332 and the reflective sheet 350'. In addition, the optical sheet 390 may directly face the light sources 332 and the reflective sheet 350'. Also, the cutout portions 351' of the reflective sheet 350', each including the cutout hole 351$h$' and the cutout slits 351$h$', may overlap the optical sheet 390 in the third direction Z. Since the middle mold 370 and the optical sheet 390 have been described above with reference to FIGS. 1 through 5, a redundant description thereof will be omitted.

Figure 9:
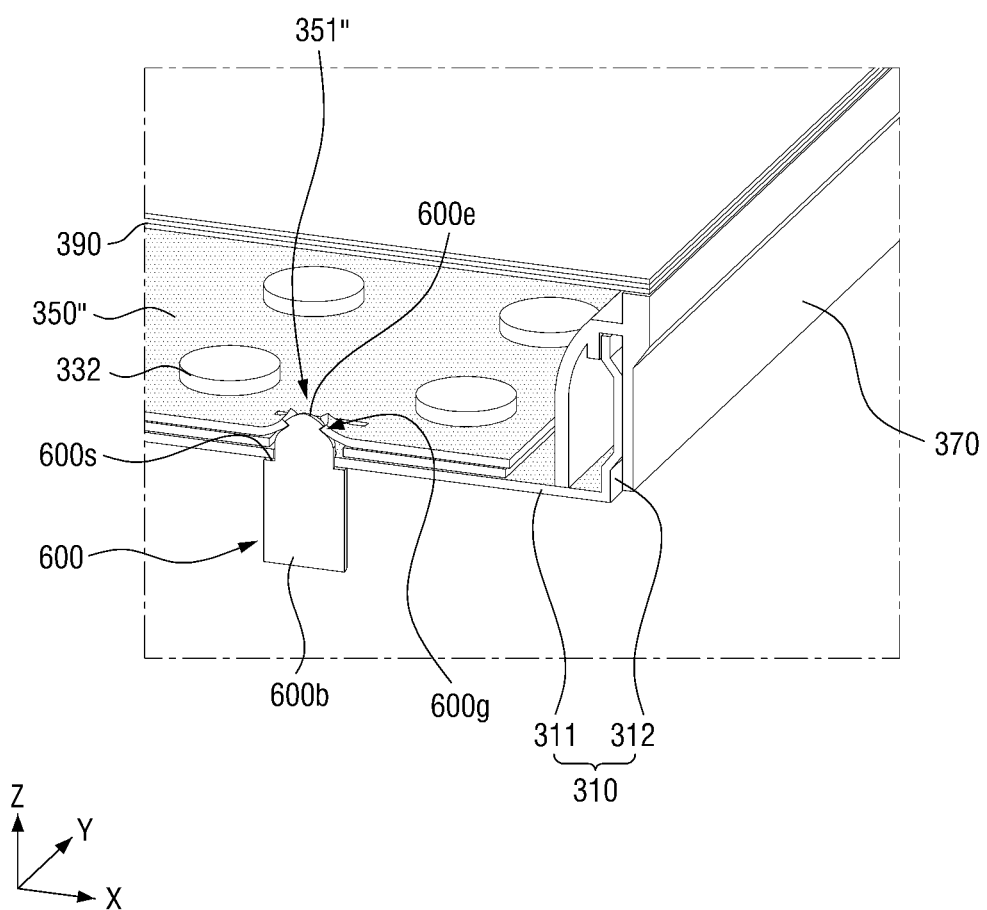

Referring to FIG. 9, a seating jig 600 is inserted into each of the through holes 310$h$ of the bottom portion 311 of the bottom chassis 310 of the backlight unit 300. In the inserting of the seating jig 600, the backlight unit 300 may be stably supported, and the position of the backlight unit 300 in the horizontal direction (i.e., the first direction X and the second direction Y) may be fixed. As a non-limiting example, two seating jigs 600 may be inserted into the through holes 310$h$ of the bottom chassis 310, respectively.

The seating jig 600 may be substantially pin-shaped. For example, the seating jig 600 may include a body portion 600$b$ having an end 600$e$, a step portion 600$s$ formed at sides of the body portion 600$b$, and a fitting groove portion 600$g$ formed at the sides of the body portion 600$b$ and located between the end 600$e$ and the step portion 600$s$.

The end 600$e$ of the seating jig 600 may have a convex curved surface. The curved end 600$e$ of the seating jig 600 enables the seating jig 600 to be easily inserted into each of the through holes 310$h$ of the bottom chassis 310 and each of the cutout holes 351$h$" of the reflective sheet 350". In addition, the curved end 600$e$ of the seating jig 600 can prevent a sheet-like member such as the reflective sheet 350" disposed on the bottom portion 311 of the bottom chassis 310 from being damaged by the seating jig 600 when the seating jig 600 is inserted into each of the through holes 310$h$ of the bottom chassis 310 of the backlight unit 300.

The sides of the seating jig 600 may have the step portion 600$s$. In the supporting of the backlight unit 300 by inserting the seating jig 600, a lower surface of the bottom portion 311 of the bottom chassis 310 may be supported by the step portion 600$s$ of the seating jig 600.

The sides of the seating jig 600 may also have the recessed groove portion 600$g$. The groove portion 600$g$ may be recessed from the sides of the seating jig 600 and may be shaped such that an object having a shape corresponding to that of the groove portion 600$g$ can be hooked.

In an exemplary embodiment, in the inserting of the seating jig 600, a portion of the reflective sheet 350" around each of the cutout portions 351" may be partially curved by the upward pressure of the end 600$e$ of the seating jig 600 and may be kept in this state. For example, as the seating jig 600 moves upward, a portion of the reflective sheet 350" between two adjacent cutout slits 351" may be partially curved by the upward pressure of the end 600$e$ of the seating jig 600.

Here, the through holes 310$h$ of the bottom chassis 310 into each of which the seating jig 600 is inserted may be the same holes as the through holes 310$h$ of the frame 310' into which the fixing pins 500 are inserted in FIG. 6. That is, through holes used in the process of manufacturing the bottom chassis 310 may be the same as through holes used in the process of manufacturing a display device after the manufacturing of the backlight unit 300. Accordingly, the number of through holes formed in the bottom chassis 310 can be minimized. In addition, since the through holes used in the process of manufacturing the bottom chassis 310 are the same as the through holes used in the process of manufacturing the display device, the dimensional management can be performed more easily, and the dimensional tolerance can be maintained low.

Figure 10:
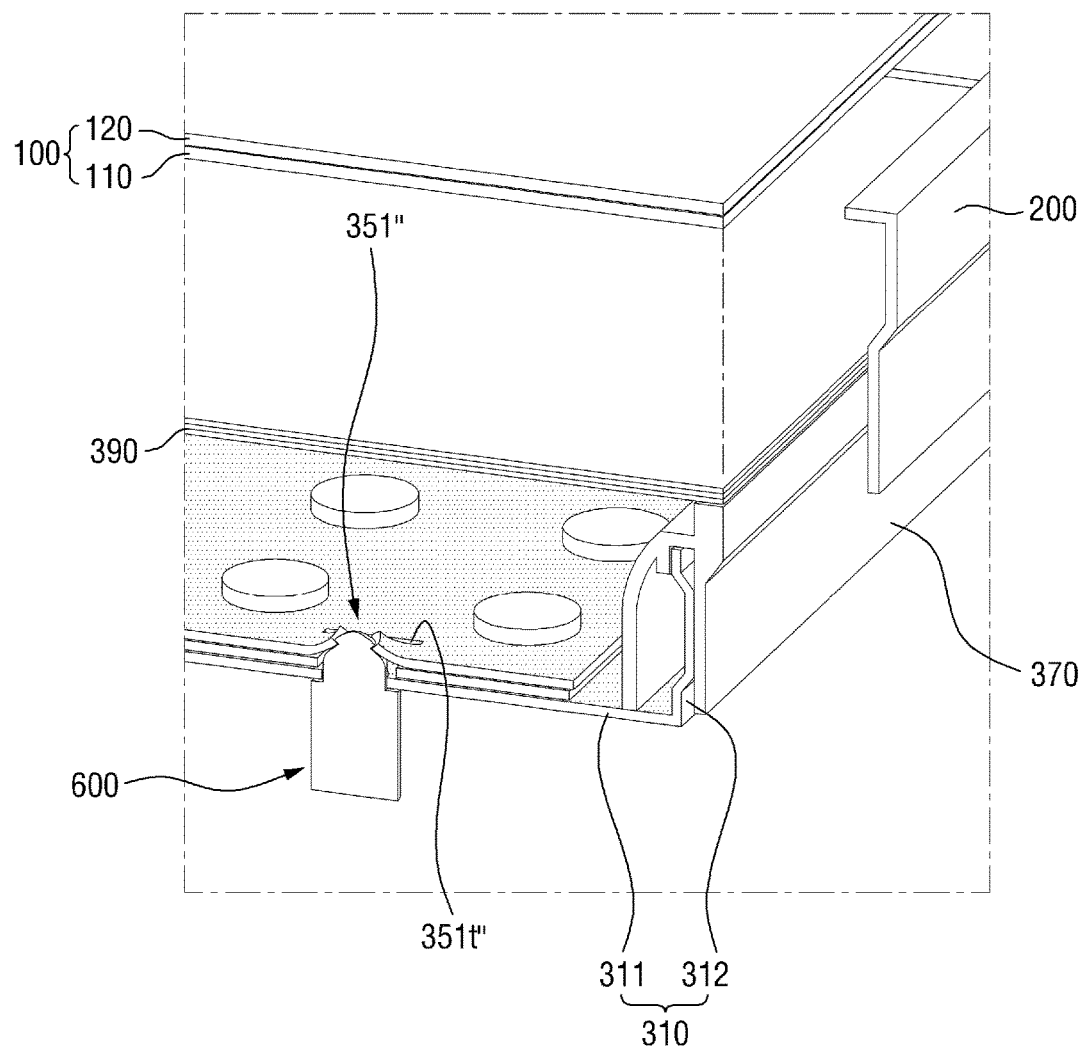

Referring to FIG. 10, a display panel 100 and a top chassis 200 are coupled to the backlight unit 300 in a state where the backlight unit 300 is supported and fixed by the seating jig 600.

The display panel 100 may be placed on the optical sheet 390. For example, a non-display area NA of the display panel 100 may be placed to overlap the support portion 373 of the middle mold 370. In addition, a display area DA of the display panel 100 may be placed to overlap the optical sheet 390 and the light sources 332 in the third direction Z. The cutout portions 351" of the reflective sheet 350", each including the cutout hole 351h" and the cutout slits 351t", may overlap the display panel 100 in the third direction Z.

As described above, since the same through holes are used in the process of manufacturing the bottom chassis 310 and in the process of manufacturing the display device, a low dimensional tolerance can be maintained. Therefore, the display panel 100 can be aligned precisely, and thus a misalignment defect of the display device 10 can be suppressed. Accordingly, this can improve the display quality and yield of the display device 10.

Next, after the placing of the display panel 100, the display panel 100 is fixed using the top chassis 200. Then, sidewalls 210 of the top chassis 200, second sidewalls 372 of the middle mold 370, and the sidewalls 312 of the bottom chassis 310 are coupled together using first screws (not illustrated). Since the display panel 100 and the top chassis 200 have been described above with reference to FIGS. 1 through 5, a redundant description thereof will be omitted.

In an exemplary embodiment, in the coupling of the display panel 100 and the top chassis 200, the portion of the reflective sheet 350" around each of the cutout portions 351" may remain curved upward.

Figure 11:
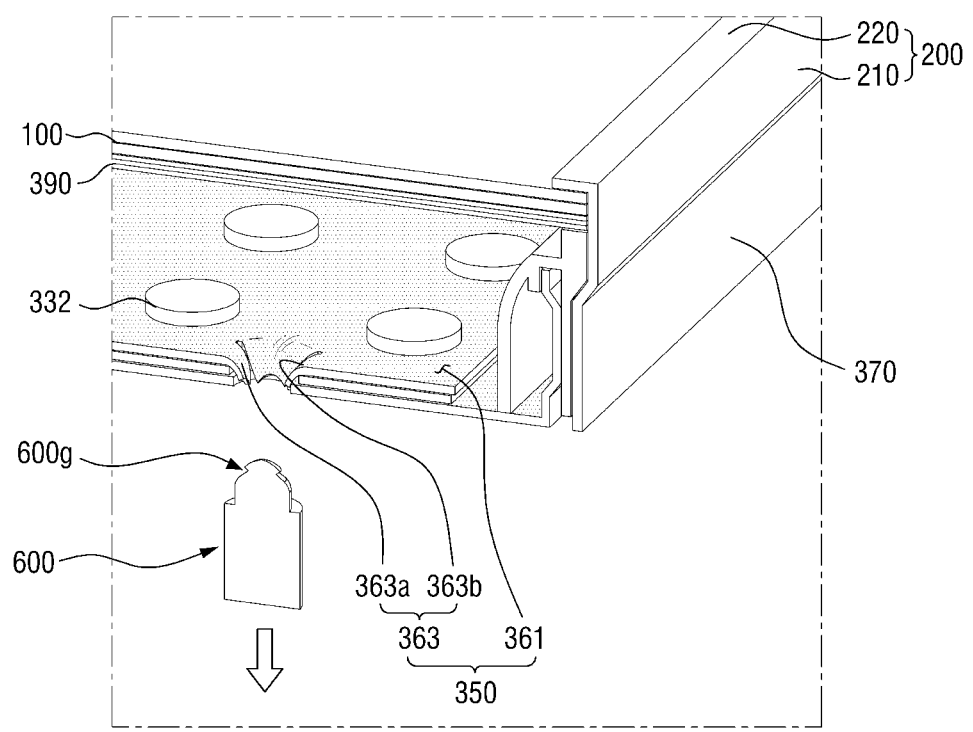
Figure 11:
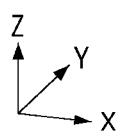

Referring to FIG. 11, the seating jig 600 is removed from each of the through holes 310h of the bottom portion 311 of the bottom chassis 310 of the backlight unit 300 coupled to the display panel 100.

In an exemplary embodiment, in the removing of the seating jig 600, the portion of the reflective sheet 350 around each of the cutout portions 351 may be partially curved by the downward pressure of the groove portion 600g of the seating jig 600 and may be kept in this state. For example, as the seating jig 600 moves downward, a portion of the reflective sheet 350 between two adjacent cutout slits 351t may be caught by the groove portion 600g of the seating jig 600 and partially curved by the downward pressure of the groove portion 600g of the seating jig 600 to form an inclined portion 363. As a result, the portion of the reflective sheet 350 around each of the cutout portions 351 of the reflective sheet 350 may form an inclined surface and thus, may be inserted into a corresponding one of the through holes 310h of the bottom chassis 310.

The reflective sheet 350 of the display device manufactured using the manufacturing method according to the current exemplary embodiment may remain at least partially inserted into the through holes 310h of the bottom chassis 310. Accordingly, the reflection sheet 350 can remain fixed in the horizontal direction (i.e., the first direction X and the second direction Y). In addition, the reflective sheet 350 can be prevented from being lifted from the bottom portion 311 of the bottom chassis 310 even though the seating jig 600 is inserted into each of the through holes 310h of the bottom chassis 310 during the process of manufacturing the display device. This can minimize the visibility of the cutout portions 351 of the reflective sheet 350 from the outside through the display panel 100.

According to an exemplary embodiment, it is possible to provide a backlight unit and a display device having excellent outgoing light efficiency and improved display quality by including a reflective sheet partially inserted into one or more through holes of a bottom chassis.

According to an exemplary embodiment, it is also possible to provide a method of manufacturing a display device, the method capable of improving process efficiency using a seating jig while preventing the damage to a reflective sheet.

However, the effects of the exemplary embodiments are not restricted to the one set forth herein. The above and other effects of the exemplary embodiments will become more apparent to one of daily skill in the art to which the exemplary embodiments pertain by referencing the claims.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A backlight unit comprising:
a bottom chassis having one or more through holes; and
a reflective sheet disposed on the bottom chassis and comprising a flat portion having a flat surface and an inclined portion connected to the flat portion to form an inclined surface,
wherein:
the inclined portion of the reflective sheet is at least partially inserted into each of the through holes of the bottom chassis;
the reflective sheet has a cutout portion in plan view;
the cutout portion comprises a cutout hole and a plurality of cutout slits extending from the cutout hole; and
a portion of the reflective sheet around the cutout portion forms the inclined surface and is inserted into each of the through holes of the bottom chassis.

2. The backlight unit of claim 1, further comprising a light source disposed on the bottom chassis and emits light,
wherein the reflective sheet further comprises a light source insertion hole, and the light source is inserted into the light source insertion hole of the reflective sheet.

3. The backlight unit of claim 2, wherein:
the bottom chassis comprises a first surface facing the reflective sheet and a second surface located opposite the first surface;
the second surface of the bottom chassis has an embossed pattern; and
each of the through holes of the bottom chassis into which the inclined portion of the reflective sheet is inserted does not overlap the embossed pattern.

4. The backlight unit of claim 3, further comprising:
a middle mold disposed on the reflective sheet; and
an optical sheet disposed on the middle mold,
wherein:
the middle mold comprises:
sidewalls;
a fixing portion connected to the sidewalls of the middle mold and protruding inward from the sidewalls of the middle mold; and
a support portion connected to the sidewalls of the middle mold and having a predetermined top surface area;
the reflective sheet is disposed between the fixing portion of the middle mold and the bottom chassis;
the sidewalls of the middle mold are housed in the bottom chassis; and
an upper surface of the support portion of the middle mold supports the optical sheet.

5. The backlight unit of claim 4, wherein:
each of the through holes of the bottom chassis is aligned with the cutout hole of the reflective sheet;

the cutout hole of the reflective sheet overlaps the optical sheet; and the reflective sheet has two cutout holes.

6. A backlight unit comprising:

a bottom chassis having one or more through holes; and a reflective sheet disposed on the bottom chassis and comprising a flat portion having a flat surface and an inclined portion connected to the flat portion to form an inclined surface;

wherein:

the inclined portion of the reflective sheet is at least partially inserted into each of the through holes of the bottom chassis; and in a cross section cut across each of the through holes of the bottom chassis, the inclined portion of the reflective sheet comprises:

a first inclined portion which is inserted into the through hole; and a second inclined portion, which is inserted into the through hole, has a different slope from the first inclined portion, and is spaced apart from the first inclined portion.

7. The backlight unit of claim 6, wherein:

the first inclined portion and the second inclined portion are simultaneously inserted into one through hole of the bottom chassis; and an end of the first inclined portion and an end of the second inclined portion are located between facing inner walls of the through hole of the bottom chassis.

8. The backlight unit of claim 6, wherein:

the bottom chassis has a substantially rectangular planar shape having two long sides and two short sides, the number of the through holes of the bottom chassis, into each of which the inclined portion of the reflective sheet is inserted, is two; and the two through holes are located on either side of a reference line passing through a center of the bottom chassis.

9. A method of manufacturing a display device, the method comprising:

preparing a backlight unit comprising a bottom chassis having a bottom portion and sidewalls and a reflective sheet housed in the bottom chassis and disposed above the bottom portion, wherein the bottom portion of the bottom chassis has one or more through holes, the reflective sheet has one or more cutout portions, and each of the cutout portions comprises a cutout hole and a plurality of cutout slits extending from the cutout hole;

supporting the backlight unit by inserting a seating jig into each of the through holes of the bottom portion of the bottom chassis;

placing a display panel on the supported backlight unit and coupling the backlight unit and the display panel to each other; and removing the seating jig from each of the through holes of the bottom portion of the bottom chassis of the backlight unit coupled to the display panel.

10. The method of claim 9, wherein:

the preparing of the backlight unit comprises:

preparing the bottom chassis having the bottom portion and the sidewalls;

placing a light source on the bottom portion of the bottom chassis; and placing the reflective sheet on the bottom portion of the bottom chassis;

the reflective sheet further comprises a light source insertion hole; and in the placing of the reflective sheet, the reflective sheet is placed such that each of the through holes of the bottom chassis is aligned with the cutout hole of the reflective sheet and that the light source is inserted into the light source insertion hole of the bottom chassis.

11. The method of claim 10, wherein the preparing of the bottom chassis comprises:

preparing a frame for manufacturing a bottom chassis, the frame having the two through holes;

fixing the position of the frame by inserting a fixing pin into each of the two through holes of the frame; and forming the bottom chassis by processing the frame through a press process or a bending process in a state where the position of the frame is fixed.

12. The method of claim 10, wherein:

in the placing of the reflective sheet on the bottom portion of the bottom chassis, the reflective sheet is substantially flat; and a planar size of the through holes of the bottom chassis is greater than that of the cutout hole of the reflective sheet.

13. The method of claim 12, wherein:

the cutout hole of the reflective sheet has substantially a circular planar shape;

the cutout hole has a diameter less than or equal to 10 millimeters and the cutout slits have a length five times or less the diameter of the cutout hole.

14. The method of claim 10, wherein:

the seating jig comprises:

a body portion having a convex curved end;

a step portion formed at sides of the body portion; and a groove portion located between the step portion and the end; and the bottom portion of the bottom chassis of the backlight unit is supported by the step portion of the seating jig in the supporting of the backlight unit by inserting the seating jig.

15. The method of claim 14, wherein, in the supporting of the backlight unit by inserting the seating jig, a portion of the reflective sheet around each of the cutout portions is partially curved by upward pressure of the end of the seating jig.

16. The method of claim 15, wherein, in the removing of the seating jig, the portion of the reflective sheet around each of the cutout portions is partially curved by downward pressure of the groove portion of the seating jig, forms an inclined surface and is inserted into one of the through holes of the bottom chassis.

17. The method of claim 10, wherein:

the preparing of the backlight unit further comprises placing an optical sheet on the reflective sheet such that the optical sheet is spaced apart from the reflective sheet; and the cutout hole of the reflective sheet overlaps the optical sheet.

18. The method of claim 17, wherein:

the coupling of the backlight unit and the display panel to each other comprises placing the display panel on the optical sheet; and the cutout hole of the reflective sheet overlaps the display panel.

* * * * *